Figure 1:
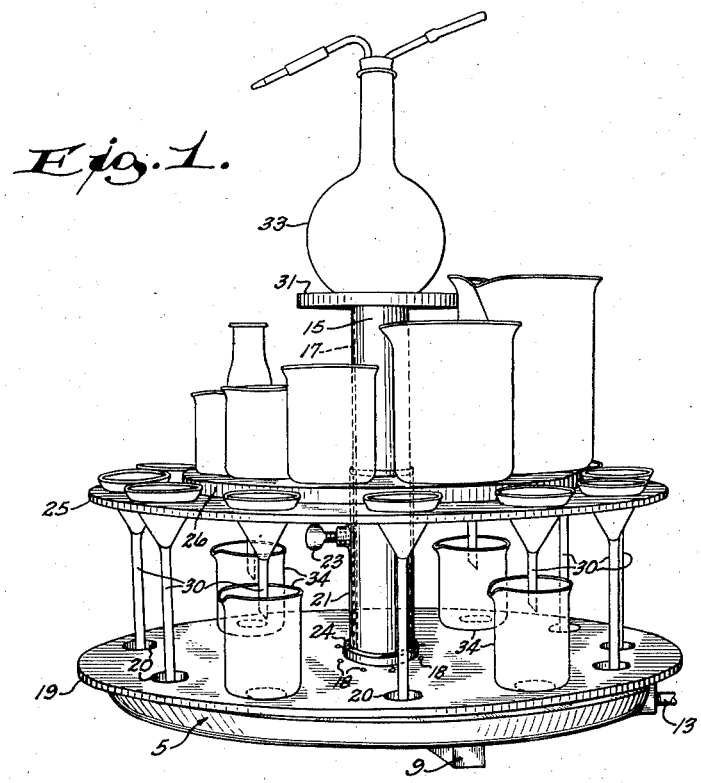

Sept. 4, 1951 W. B. SOBERS 2,566,430
SUPPORT FOR LABORATORY FILTERING
APPARATUS OR THE LIKE
Filed Jan. 26, 1948

INVENTOR.
Winfield B. Sobers
BY
Morrell & Morrell
ATTORNEYS.

Patented Sept. 4, 1951

2,566,430

UNITED STATES PATENT OFFICE 2,566,430

SUPPORT FOR LABORATORY FILTERING
APPARATUS OR THE LIKE

Winfield B. Sobers, Milwaukee, Wis., assignor to
Precision Scientific Company, Chicago, Ill., a
corporation of Illinois Application January 26, 1948, Serial No. 4,344

12 Claims. (Cl. 23—259)

This invention relates to improvements in supports for laboratory filtering apparatus or the like.

Filtration is one of the most common operations performed in chemical laboratories, and in some laboratories a large number of filtering operations are carried on at the same time. Frequently, one person must attend to a plurality of these operations and must continually move from one filtering apparatus set-up to another, adding solution to the filters as required in order to keep all of the filters in operation and thereby maintain the highest efficiency.

Conventionally, each filtering apparatus set-up or assembly consists of a glass filter funnel wherein the filter paper is supported, a filter funnel supporting stand, a beaker containing the solution to be filtered, and a beaker in which the filtrate is collected. It may be desired to retain the filtrate, or this filtrate may be discarded upon completion of the filtering operation. At present, the usual laboratory procedure is for the operator to line up along the laboratory table all of the individual filtering set-ups and then move along the entire length of the table adjacent the set-ups attending to each as needed. To add solution to a filter, the beaker containing the solution to be filtered must be raised from its position on the table to a position over the top of the filter funnel, and then when the desired amount of solution has been added, the beaker is returned to its former position on the table. Transferring the beakers through the above mentioned positions not only requires many time consuming lifting operations, but also creates a likelihood of striking the funnel stand or the funnel with the beaker during its travel to or from pouring position. Such striking may result in spilling of the solution, in dropping of the beaker, or in breakage.

With the above in mind it is, therefore, a general object of the invention to provide a support for laboratory filtering apparatus which will rotatably accommodate a plurality of filtering assemblies, each of which may comprise a filter funnel and a pair of beakers.

A further object of the invention is to provide a means for supporting a plurality of filtering assemblies which requires a minimum of table top area and permits the operator to attend to each or any individual filtering assembly without having to move from a position adjacent the improved support.

A further object of the invention is to provide a support for a plurality of filtering assemblies which support is provided with a common trough adjacent said assemblies into which filtrate from one or more of said assemblies may be directed by the stems of the filtering funnels thereof, said trough being connectable either with a single container into which the filtrate is to be collected, or with a sink drain, thereby eliminating the handling and washing of a plurality of individual beakers which would otherwise be used to collect the filtrate from each assembly.

A further object of the invention is to provide a support for a plurality of filtering assemblies which support is provided with a trough common to all of said assemblies into which filtrate therefrom may be directed, said trough having connections with a source of cold flushing water and having an outlet whereby continuous flushing of the trough is possible thereby eliminating the escape of noxious fumes and volatile gases into the atmosphere of the laboratory.

A further more specific object of the invention is to provide a rotatable support for a plurality of filtering assemblies which comprises a pair of vertically adjustably spaced discs, each formed with a plurality of apertures adjacent the periphery thereof, the apertures of the upper disc being alineable with the apertures of the lower disc and said discs being connected for rotatable movement as a unit, there being a circular trough positioned under the apertures of said lower disc whereby a plurality of filtering funnels may be supported in the apertures of the upper disc and whereby the stems of said funnels may selectively project into the apertures of the lower disc to permit drainage of filtrate into the trough or they may project into containers thereunder supported on said lower disc for collection of filtrate therein.

A further object of the invention is to provide a rotatable support for a plurality of filtering assemblies which makes provision for a convenient stand above the level of the tops of the filtering funnels on which to store the containers for the solutions to be filtered prior to the introduction of the solutions into the respective filters. This eliminates the need for raising the containers from the table top level to a position above the funnel in order to pour solutions into the funnels and, in addition, reduces the possibility of striking the containers against the funnels while transferring said containers from storage position to pouring position.

A further more specific object of the invention is to provide a rotatable support for a plurality of filtering units which provides a convenient storage shelf for a wash bottle, or for other apparatus useful in the operation of the filtering assemblies, said shelf being located above the level of the tops of the filtering funnels and above and inwardly of the support for solution containers, said shelf being formed with an integral annular bushing on its under side which acts as a centering member for the rotating portion of the apparatus.

A further object of the invention is to provide a rotatable support for a plurality of filtering assemblies consisting of a pair of apertured vertically adjustably spaced discs the upper of which is adapted to support a plurality of filtering funnels, said support being provided with stop means whereby the upper of said discs is prevented from moving below a predetermined position and whereby breakage of glassware from accidental lowering of the upper disc to a position too close to the lower disc is prevented.

With the above and other objects in view, the invention consists of the improved rotatable support for laboratory filtering apparatus or the like, and all of its parts and combinations as set forth in the claims, and all equivalents thereof.

Figure 2:
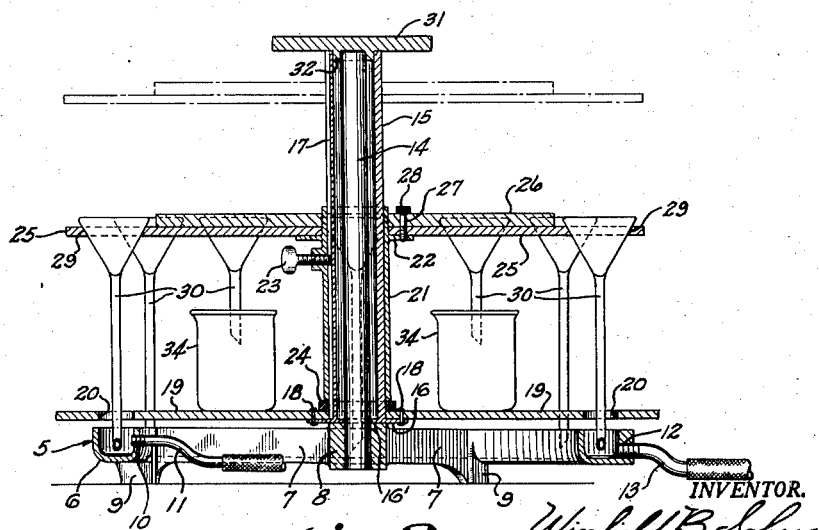

In the accompanying drawing, illustrating one complete embodiment of the preferred form of the invention, in which the same reference characters indicate the same parts in all of the views:

Fig. 1 is a perspective view of the invention showing a plurality of filtering assemblies supported thereon; and Fig. 2 is a vertical sectional view of the invention, there being a dot and dash line showing of the upper discs in raised position.

Referring more particularly to the drawing, the numeral 5 designates a base member comprising an annular trough 6 formed integral with radial supporting arms 7, preferably three in number, said arms meeting at the center to form an apertured hub member 8. The arms 7, at their outer ends, are formed with downwardly and outwardly projecting legs 9 which extend underneath the trough 6. The trough 6 is preferably apertured as at 10 to receive an outlet connection 11 for flushing water, and diametrically opposite therefrom the trough 6 is apertured as at 12 to receive a drain connection 13. The trough 6 slopes slightly downwardly from the flushing water inlet side to the drain side.

Fixed in the aperture of the hub 8 and projecting vertically upward therefrom is an elongated cylindrical member or rod 14. Concentric with the cylindrical member 14 and rotatably supported on the hub 8 is a tubular member 15 which is formed at its lower end with an outwardly projecting flange 16 and an inwardly projecting flange 16'. The tubular member 15 is also formed with a longitudinal exterior groove 17. Rigidly connected to the flange 16, as by rivets 18, and supported by said flange, is a centrally apertured lower disc 19. The disc 19 is formed with a plurality of apertures 20 adjacent the periphery thereof.

Concentric with the tubular member 15 and slidable thereon is a sleeve 21. The sleeve 21 is preferably formed with an outwardly projecting flange 22 adjacent the upper end thereof, and is also formed to threadedly receive a manually adjustable set screw 23. The inner end of the screw 23 is adapted to engage the groove 17 of the member 15, and to act as a releasable locking member for holding the sleeve 21 in any selected position of vertical adjustment while at the same time preventing rotative movement of the sleeve 21 relative to the member 15. A shock absorbing ring 24 of rubber or other suitable material is preferably placed on the disc 19 surrounding the member 15. Thus, when the sleeve 21 is in its lowermost position it rests on the ring 24, as shown in Figs. 1 and 2.

A centrally apertured upper disc 25 is supported on the flange 22 of the sleeve 21, and another centrally apertured disc 26 of smaller diameter than that of the disc 25 is superimposed on the disc 25, as shown in Figs. 1 and 2. The discs 25 and 26 may be rigidly connected to the flange 22 by means of the screw 27. The screw 27 is provided with a knurled head 28 and may be manually removed from the flange 22 to permit rotation of the discs 25 and 26 relative to the flange 22, should this be required for certain laboratory procedures. The disc 25 is formed with a plurality of apertures 29 which are preferably bevelled and which are adapted to receive standard laboratory funnels, such as are shown at 30, or other laboratory equipment. The thickness of the disc 26 and the size of the apertures 29 are such that the top edges of standard laboratory funnels when positioned in the apertures 29 are spaced slightly below the upper surface of the disc 26, as is clear from Figs. 1 and 2.

Supported on the top of the tubular member 15 is a shelf 31 which is formed on its under side with an annular bushing 32. The bushing 32 projects downwardly between the upper end of the cylindrical member 14 and the upper end of the tubular member 15, as is clearly shown in Fig. 2. The bushing 32 acts as a bearing between the upper end of the tubular member 15 and the cylindrical member 14, and the inwardly projecting flange 16' serves as a bearing between the lower end of the member 15 and the member 14. The shelf 31 may be used for the storage of a wash bottle 33 or other laboratory equipment.

The apertures 20 in the lower disc 19 are positioned to register with the annular trough 6, and when the disc 25 is fixed to the flange 22, the apertures of the disc 25 are in vertical alignment with those of the disc 19, as is shown in the drawing. This latter arrangement is that which is normally used during ordinary filtering operations. The sleeve 21, and the discs 25 and 26, supported thereon, are movable to any desired position of vertical adjustment. The dot and dash lines of Fig. 2 indicate the discs 25 and 26 in a raised position.

In a filtering operation where the filtrate is to be discarded, much handling and washing of glassware may be avoided by projecting the stems of the filtering funnels through the apertures 20 of the disc 19 and into the trough 6. The filtrate will then be carried out the drain 13 by flushing water from the inlet 11. If the filtrate is to be collected, this may be done either by containers such as the beakers 34 placed on the lower disc 19 as shown, or by not using flushing water in the trough 6, and by then collecting the filtrate at the drain 13 of the trough. The sleeve 21 being movable vertically, permits the use of long stemmed funnels in connection with collecting beakers instead of the short stemmed funnels shown with the beakers 34. Due to the fact that the sleeve 21 cannot move below its position shown in the drawing, the lower ends of the funnels projecting through the apertures 20 and into the trough 6 will never come in contact with the bottom of the trough 6. The use of a sleeve of the length shown is therefore a safety measure which prevents the accidental lowering of the disc 25 to a position wherein the funnels might be dislodged from the supporting apertures 29 with resulting spillage or breakage.

As shown in Fig. 1, the disc 26 may be used as a shelf on which to store containers of solutions which are about to be put into the filtering funnels 30. This convenient storage space eliminates the need for raising the containers of solution from the laboratory table top to a pouring position each time it is desired to add some solution. Since the top of the disc 26 is above the level of the tops of the funnels 30, the likelihood of striking these funnels with the solution containers while transferring said containers to and from pouring position is greatly reduced.

In operation, the discs 19 and 25 are normally rotatable as a unit. In order for the operator to attend to any particular filtering assembly carried by the improved support, it is only necessary for him to rotate the discs 19 and 25 to bring said assembly to a convenient position. This is in contrast to the conventional procedure of having to move back and forth along the length of a laboratory table where a series of filtering assemblies is set up along the top thereof.

The disc 19 not only provides a support for the beakers 34, but it also forms a cover for the trough 6 to aid in reducing the amount of fumes and gases which escape into the atmosphere. These fumes and gases being confined to the trough are quickly carried away by the flushing water.

Various changes and modifications can be made without departing from the spirit of the invention, and all of such changes are contemplated, as will come within the scope of the claims.

What I claim is:

1. A support for laboratory filtering apparatus or the like comprising a base, a cylindrical member supported by said base for rotation on a vertical axis, a first horizontally extending disc fixedly mounted on said cylindrical member for rotation therewith, a sleeve member concentrically slidable on said cylindrical member above said disc and movable on said member toward and away from said disc, a second horizontally extending disc supported by said sleeve and movable therewith relative to said first disc, each of said discs being formed with a plurality of apertures adjacent the periphery thereof, releasable means for locking said sleeve in a selected vertical position on said cylindrical member relative to said first disc, and an annular trough on said base member positioned below the apertures of said first mentioned disc.

2. A support for laboratory filtering apparatus or the like comprising a base, a cylindrical member supported by said base for rotation on a vertical axis, a first horizontally extending disc fixedly mounted on said cylindrical member for rotation therewith, a sleeve member concentrically slidable on said cylindrical member above said disc and movable on said member toward and away from said disc, a second horizontally extending disc supported by said sleeve a predetermined distance above the lower end thereof and movable therewith relative to said first disc, each of said discs being formed with a plurality of apertures adjacent the periphery thereof, releasable means for locking said sleeve in a selected vertical position on said cylindrical member relative to said first disc, and an annular trough on said base member positioned below the apertures of said first mentioned disc.

3. A support for laboratory filtering apparatus or the like comprising a base, a cylindrical member supported by said base for rotation on a vertical axis, a first horizontally extending disc fixedly mounted on said cylindrical member for rotation therewith, a sleeve member concentrically slidable on said cylindrical member above said disc and movable on said member toward and away from said disc, a second horizontally extending disc supported by said sleeve and movable therewith relative to said first disc, each of said discs being formed with a plurality of apertures adjacent the periphery thereof, releasable means for locking said sleeve in a selected vertical position on said cylindrical member relative to said first disc, an annular trough on said base member positioned below the apertures of said first mentioned disc, means for supplying flushing water to said trough, and an outlet for said trough.

4. A support for laboratory filtering apparatus or the like comprising a base, a cylindrical member projecting upwardly from said base, a tubular member concentric with said cylindrical member and supported by said base for rotation on a vertical axis, a stand supported by the top of said tubular member and having an annular bushing depending therefrom, said bushing being positioned between said cylindrical member and said tubular member, a horizontally extending disc fixedly mounted on said tubular member for rotation therewith, a sleeve concentrically slidable on said tubular member and positioned above said disc, a second horizontally extending disc supported by said sleeve, each of said discs being formed with a plurality of apertures adjacent the periphery thereof, releasable means for locking said sleeve in a selected vertical position on said tubular member, and an annular trough on said base member positioned below the apertures of said first mentioned disc.

5. A support for laboratory filtering apparatus or the like comprising a base, a cylindrical member projecting upwardly from said base, a tubular member surrounding and concentric with said cylindrical member and supported by said base for rotation on a vertical axis, a horizontally extending disc fixedly mounted on said tubular member for rotation therewith, a sleeve member concentrically slidable on and non-rotatably connected to said tubular member and positioned above said disc, a second horizontally extending disc supported by said sleeve, each of said discs being formed with a plurality of apertures adjacent the periphery thereof, releasable means for locking said sleeve in a selected vertical position on said tubular member, and an annular trough on said base member positioned below the apertures of said first mentioned disc.

6. A support for laboratory filtering apparatus or the like comprising a base, a cylindrical member projecting upwardly from said base, a tubular member surrounding and concentric with said cylindrical member for rotation on a vertical axis, a horizontally extending disc fixedly mounted on said tubular member for rotation therewith, a sleeve concentrically slidable on and non-rotatably connected to said tubular member positioned above said disc, said sleeve being formed with an outwardly projecting flange, a second horizontally extending disc supported by said flange, each of said discs being formed with a plurality of apertures adjacent the periphery thereof, said second disc being so supported by the flange that it may be rotatably adjusted relative to the first disc, releasable means for locking said sleeve in a selected vertical position on said tubular member, an annular trough on said base member positioned below the apertures of said first mentioned disc, and an outlet for said trough.

7. A support for laboratory filtering apparatus or the like comprising a base, a cylindrical member projecting upwardly from said base, a tubular member concentric with and surrounding said cylindrical member for rotation on a vertical axis, a horizontally extending disc fixedly mounted on said tubular member for rotation therewith, a sleeve concentrically slidable on and non-rotatably connected to said tubular member positioned above said disc, said sleeve being formed with an outwardly projecting flange, a second horizontally extending disc supported by said flange, each of said discs being formed with a plurality of apertures adjacent the periphery thereof, releasable means for locking said sleeve in a selected vertical position on said tubular member, an annular trough on said base member positioned below the apertures of said first mentioned disc, a connection on said trough for the introduction of flushing water, and an outlet connection for said trough.

8. A support for laboratory filtering apparatus or the like comprising a base, a cylindrical member projecting upwardly from said base, a tubular member concentric with and surrounding said cylindrical member for rotation on a vertical axis, a horizontally extending disc fixedly mounted on said tubular member for rotation therewith, a sleeve concentrically slidable on and non-rotatably connected to said tubular member positioned above said disc, said sleeve being formed with an outwardly projecting flange, a second horizontally extending disc rigidly connected to said flange, each of said discs being formed with a plurality of apertures adjacent the periphery thereof, the apertures of one disc being in substantial vertical alignment with the apertures of the other disc, manually releasable screw means for locking said sleeve in a selected vertical position on said tubular member, an annular trough on said base member positioned below the apertures of said first mentioned disc, a connection on said trough for the introduction of flushing water, and an outlet connection for said trough.

9. A support for laboratory filtering apparatus or the like comprising a base, a cylindrical member projecting upwardly from said base, a tubular member concentric with and surrounding said cylindrical member and supported by said base for rotation on a vertical axis, a horizontally extending disc fixedly mounted on said tubular member for rotation therewith, a sleeve centrically slidable on and non-rotatably connected to said tubular member positioned above said disc, said sleeve being formed with an outwardly projecting flange, a second horizontally extending disc supported by said flange, removable means for connecting said second disc to said sleeve flange to provide for selective rotation of said second disc relative to said flange, each of said discs being formed with a plurality of apertures adjacent the periphery thereof, a manually adjustable screw on said sleeve for locking said sleeve in a selected vertical position on said tubular member, an annular trough on said base member positioned below the apertures of said first mentioned disc, a connection on said trough for the introduction of flushing water, and an outlet connection for said trough.

10. A support for laboratory filtering apparatus or the like comprising: a base; a horizontally extending beaker supporting disc formed with apertures adjacent the periphery thereof; a horizontally extending funnel supporting disc; means supporting said two discs on said base for coaxial rotation in spaced horizontal planes with the funnel supporting disc above the beaker supporting disc, said funnel supporting disc being formed with a plurality of funnel receiving apertures in vertical alinement with the apertures of the beaker supporting disc, and said funnel supporting disc being spaced above the beaker supporting disc a distance sufficient to permit filtrate collecting beakers to be placed on said beaker supporting disc below the apertures of said funnel supporting disc; and an annular trough positioned on said base below said beaker supporting disc and in alinement with the apertures thereof, whereby filtrate from funnels carried by the funnel supporting disc may be drained into said trough or alternatively collected in beakers positioned on the beaker supporting disc.

11. A support for laboratory filtering apparatus or the like comprising: a base; a horizontally extending beaker supporting disc formed with apertures adjacent the periphery thereof; a horizontally extending funnel supporting disc; means supporting said two discs on said base for coaxial rotation in spaced horizontal planes with the funnel supporting disc adjustably positioned above the beaker supporting disc, said funnel supporting disc being formed with a plurality of funnel receiving apertures in vertical alinement with the apertures of the beaker supporting disc and said funnel supporting disc being spaced above the beaker supporting disc a minimum distance at least sufficient to permit filtrate collecting beakers to be placed on said beaker supporting disc below the apertures of said funnel supporting disc; and an annular trough positioned on said base below said beaker supporting disc and in alinement with the apertures thereof, whereby filtrate from funnels carried by the funnel supporting disc may be drained into said trough or alternatively collected in beakers positioned on the beaker supporting disc.

12. A support for laboratory filtering apparatus or the like comprising: a base; a horizontally extending beaker supporting disc rotatably mounted on said base and formed with apertures adjacent the periphery thereof; a horizontally extending funnel supporting disc; means supporting said two discs on said base for coaxial rotation in spaced horizontal planes with the funnel supporting disc above the beaker supporting disc, said funnel supporting disc being formed with a plurality of funnel receiving apertures in vertical alinement with the apertures of the beaker supporting disc and said funnel supporting disc being spaced above the beaker supporting disc a minimum distance at least sufficient to permit filtrate collecting beakers to be placed on said beaker supporting disc below the apertures of said funnel supporting disc; an annular trough having an outlet positioned on said base below said beaker supporting disc and in alinement with the apertures thereof, whereby filtrate from funnels carried by the funnel supporting disc may be drained into said trough or alternatively collected in beakers positioned on the beaker supporting disc; and means for introducing flushing water into said annular trough.

WINFIELD B. SOBERS.

REFERENCES CITED

The following references are of record in the file of this patent:

UNITED STATES PATENTS

| Number | Name | Date |
|---|---|---|
| 169,348 | Fahlberg | Nov. 2, 1875 |
| 615,032 | Mandel | Nov. 29, 1898 |
| 732,227 | Shafer et al. | June 30, 1903 |
| 1,097,708 | Elson | May 26, 1914 |
| 1,203,818 | Trinkl | Nov. 7, 1916 |
| 1,890,939 | Fahrney | Dec. 13, 1932 |
| 2,186,432 | Rosenthal | Jan. 9, 1940 |
| 2,281,849 | McCoppin | May 5, 1942 |

FOREIGN PATENTS

| Number | Country | Date |
|---|---|---|
| 14,448 | Great Britain | of 1895 |

OTHER REFERENCES

Fisher: "Modern Laboratory Appliances," vol. 90, page 854, item 14–733, page 855, item 14–745. Copyright 1942.